(12) United States Patent
Puzio

(10) Patent No.: US 7,547,165 B2
(45) Date of Patent: Jun. 16, 2009

(54) PTO SELECTOR MECHANISM WITH BRAKE

(75) Inventor: Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 37 days.

(21) Appl. No.: 11/740,387

(22) Filed: Apr. 26, 2007

(65) Prior Publication Data

US 2007/0187908 A1 Aug. 16, 2007

Related U.S. Application Data

(63) Continuation-in-part of application No. 11/693,384, filed on Mar. 29, 2007, and a continuation-in-part of application No. 11/400,378, filed on Apr. 10, 2006, which is a continuation-in-part of application No. 11/227,200, filed on Sep. 16, 2005.

(60) Provisional application No. 60/795,564, filed on Apr. 28, 2006.

(51) Int. Cl.
*B23B 31/16* (2006.01)

(52) U.S. Cl. .................. 408/124; 408/139; 279/60; 279/135; 279/902

(58) Field of Classification Search ............... 408/124, 408/139; 279/60–65, 134, 135, 902; *B23B 31/16*
See application file for complete search history.

(56) References Cited

U.S. PATENT DOCUMENTS

| | | | |
|---|---|---|---|
| 913,059 A | 2/1909 | Savage | |
| 1,705,275 A | * 3/1929 | Von Neudeck | ............... 279/64 |
| 2,353,514 A | 7/1944 | Slater | |
| 2,684,856 A | 7/1954 | Stoner | |
| 2,716,555 A | 8/1955 | Rowe | |
| 2,848,911 A | 8/1958 | Black | |
| 2,931,660 A | 4/1960 | Barwinkel | |
| 2,963,913 A | * 12/1960 | Wensloff | ............... 74/15.6 |
| 3,506,277 A | 4/1970 | Harms | |
| 3,545,766 A | 12/1970 | Osborn | |
| 3,776,647 A | 12/1973 | Hart | |
| 3,970,323 A | 7/1976 | Schnizler, Jr. | |

(Continued)

FOREIGN PATENT DOCUMENTS

DE 1985830 5/1968

(Continued)

*Primary Examiner*—David P Bryant
*Assistant Examiner*—Eric A Gates
(74) *Attorney, Agent, or Firm*—Capitol City TechLaw

(57) ABSTRACT

A power driver may include a housing, a tool chuck and a power take off mechanism. The tool chuck may have an input shaft mounted for rotation on the housing. The input shaft may support chuck jaws. A chuck actuating shaft may be mounted for rotation on the input shaft. The power take off mechanism may be connected to the tool chuck. The power take off mechanism may be adjustable into a DRILL/DRIVE MODE to rotationally drive the input shaft and the chuck actuating shaft together as a unit. Here, a brake may resist relative rotation between the input shaft and the chuck actuating shaft. The power take off mechanism may be adjustable into a CHUCK MODE in which a gear mounted on the input shaft may rotationally drive the chuck actuating shaft relative to the input shaft. Here, the brake may be deactivated.

19 Claims, 11 Drawing Sheets

U.S. PATENT DOCUMENTS

| | | | |
|---|---|---|---|
| 4,085,337 A * | 4/1978 | Moeller | 307/115 |
| 4,094,523 A | 6/1978 | Derbyshire | |
| 4,260,169 A | 4/1981 | Hall | |
| 4,277,074 A | 7/1981 | Kilberis | |
| 4,302,021 A | 11/1981 | Röhm | |
| 4,317,578 A | 3/1982 | Welch | |
| 4,323,324 A | 4/1982 | Eberhardt | |
| 4,358,230 A | 11/1982 | Rohlin | |
| 4,395,170 A | 7/1983 | Clarey | |
| 4,493,407 A | 1/1985 | Newton | |
| 4,498,682 A | 2/1985 | Glore | |
| 4,526,497 A | 7/1985 | Hatfield | |
| 4,527,809 A | 7/1985 | Umbert | |
| 4,536,113 A | 8/1985 | Hatfield | |
| 4,557,703 A | 12/1985 | Rivin | |
| 4,605,345 A | 8/1986 | Giughese | |
| 4,628,918 A | 12/1986 | Johnson, Jr. | |
| 4,655,464 A | 4/1987 | Manschitz et al. | |
| 4,664,394 A | 5/1987 | Theissig et al. | |
| 4,669,930 A | 6/1987 | Stenmark | |
| 4,669,932 A | 6/1987 | Hartley | |
| 4,682,918 A | 7/1987 | Palm | |
| 4,788,021 A | 11/1988 | Griffiths | |
| 4,802,798 A | 2/1989 | Adamson | |
| 4,824,298 A | 4/1989 | Lippacher et al. | |
| 4,840,387 A | 6/1989 | McCarthy | |
| 4,848,779 A | 7/1989 | Wheeler et al. | |
| 4,930,793 A | 6/1990 | Ando | |
| 4,951,955 A | 8/1990 | Sakamaki | |
| 4,955,623 A | 9/1990 | Röhm | |
| 4,958,840 A | 9/1990 | Palm | |
| 4,976,575 A | 12/1990 | Kappelhof et al. | |
| 4,998,589 A | 3/1991 | Wiesendanger | |
| 5,011,343 A | 4/1991 | Saban et al. | |
| 5,019,023 A | 5/1991 | Kurosawa | |
| 5,022,278 A | 6/1991 | DeCaussin | |
| 5,031,925 A * | 7/1991 | Tatsu et al. | 279/64 |
| 5,067,376 A | 11/1991 | Fossella | |
| 5,090,273 A | 2/1992 | Fossella | |
| 5,125,673 A | 6/1992 | Huff et al. | |
| 5,145,193 A | 9/1992 | Röhm | |
| 5,147,164 A | 9/1992 | Fraver | |
| 5,171,030 A | 12/1992 | Röhm | |
| 5,172,923 A | 12/1992 | Nakamura | |
| 5,174,588 A | 12/1992 | Reibetanz et al. | |
| 5,183,274 A | 2/1993 | Sakamaki | |
| 5,195,760 A * | 3/1993 | Wheeler et al. | 279/60 |
| 5,197,749 A | 3/1993 | Moore et al. | |
| 5,215,317 A | 6/1993 | Jordan et al. | |
| 5,232,230 A | 8/1993 | Lin | |
| 5,286,041 A | 2/1994 | Röhm | |
| 5,299,814 A | 4/1994 | Salpaka | |
| 5,322,303 A | 6/1994 | Nakamura | |
| 5,339,908 A | 8/1994 | Yokota et al. | |
| 5,340,248 A | 8/1994 | Enbergs | |
| 5,342,154 A | 8/1994 | Holzer | |
| 5,343,961 A | 9/1994 | Ichikawa | |
| 5,348,317 A | 9/1994 | Steadings et al. | |
| 5,348,318 A | 9/1994 | Steadings et al. | |
| 5,407,215 A | 4/1995 | Yang | |
| 5,419,663 A | 5/1995 | Psomas | |
| 5,431,420 A | 7/1995 | Huff et al. | |
| 5,435,578 A | 7/1995 | Röhm | |
| 5,448,931 A | 9/1995 | Fossella et al. | |
| 5,458,345 A | 10/1995 | Amyot | |
| 5,499,829 A | 3/1996 | Röhm | |
| 5,499,830 A | 3/1996 | Schnizler | |
| 5,531,549 A | 7/1996 | Fossella | |
| 5,553,873 A | 9/1996 | Salpaka et al. | |
| 5,573,358 A | 11/1996 | Gobbers et al. | |
| 5,624,125 A | 4/1997 | Röhm | |
| 5,685,549 A | 11/1997 | Yang | |
| 5,732,956 A | 3/1998 | Huff et al. | |
| 5,741,016 A | 4/1998 | Barton et al. | |
| 5,795,110 A | 8/1998 | Wirth et al. | |
| 5,820,134 A | 10/1998 | Subils Valls | |
| 5,908,076 A | 6/1999 | Marcengill et al. | |
| 5,918,685 A | 7/1999 | Ulbrich et al. | |
| 5,922,538 A | 7/1999 | Hazel et al. | |
| 5,951,026 A | 9/1999 | Harman, Jr. et al. | |
| 5,957,469 A | 9/1999 | Miles et al. | |
| 5,988,653 A | 11/1999 | Kuo | |
| 5,988,958 A | 11/1999 | Mack | |
| 5,992,859 A | 11/1999 | Lin | |
| 6,007,071 A | 12/1999 | Middleton | |
| 6,007,277 A | 12/1999 | Olson et al. | |
| 6,017,039 A | 1/2000 | Gaddis et al. | |
| 6,056,298 A | 5/2000 | Williams | |
| 6,079,716 A | 6/2000 | Harman, Jr. et al. | |
| 6,105,450 A | 8/2000 | Sasaki et al. | |
| 6,139,228 A | 10/2000 | Longo | |
| 6,173,972 B1 | 1/2001 | Temple-Wilson et al. | |
| 6,241,260 B1 * | 6/2001 | Judge et al. | 279/64 |
| 6,260,856 B1 | 7/2001 | Temple-Wilson | |
| 6,354,605 B1 | 3/2002 | Aultman | |
| 6,398,226 B1 | 6/2002 | Huggins et al. | |
| 6,431,289 B1 | 8/2002 | Potter | |
| 6,488,286 B2 | 12/2002 | Yaksich | |
| 6,488,287 B2 | 12/2002 | Gaddis et al. | |
| 6,506,002 B1 | 1/2003 | Cummins | |
| 6,517,295 B2 | 2/2003 | Lin | |
| 6,523,658 B2 | 2/2003 | Furuta et al. | |
| 6,648,563 B2 | 11/2003 | Rohm | |
| 6,729,812 B2 | 5/2004 | Yaksich et al. | |
| 6,733,393 B2 | 5/2004 | Rivin | |
| 6,736,410 B2 | 5/2004 | Barton et al. | |
| 6,832,764 B2 | 12/2004 | Steadings et al. | |
| 6,843,484 B2 * | 1/2005 | Schroeder | 279/60 |
| 7,021,400 B2 | 4/2006 | Oretti | |
| 7,073,606 B2 | 7/2006 | Mamber et al. | |
| 7,328,904 B2 * | 2/2008 | Schell et al. | 279/60 |
| 2001/0026051 A1 | 10/2001 | Gifford et al. | |
| 2003/0077137 A1 | 4/2003 | Rohm | |
| 2004/0146367 A1 | 7/2004 | Gerhardt et al. | |
| 2005/0013674 A1 | 1/2005 | Vidal | |
| 2006/0027978 A1 | 2/2006 | Young et al. | |
| 2006/0066063 A1 | 3/2006 | Nickels et al. | |
| 2006/0188350 A1 * | 8/2006 | Gehret et al. | 408/240 |

FOREIGN PATENT DOCUMENTS

| | | |
|---|---|---|
| DE | 2317779 | 10/1974 |
| DE | 7536582 | 5/1976 |
| DE | 7617128 | 12/1976 |
| DE | 2757140 | 6/1979 |
| DE | 8002633 | 7/1980 |
| DE | 3110458 | 10/1982 |
| DE | 3140776 | 4/1983 |
| DE | 8513848 | 8/1985 |
| DE | 9006555 | 9/1990 |
| DE | 9405628 | 7/1994 |
| DE | 3527234 | 2/1997 |
| DE | 29820433 | 3/1999 |
| DE | 29913083 | 10/1999 |
| DE | 10125186 | 12/2002 |
| DE | 202004003323 | 8/2004 |
| DE | 10359420 | 7/2005 |
| EP | 0448801 | 10/1991 |
| EP | 0515371 | 12/1992 |
| EP | 0620069 | 10/1994 |
| EP | 0716896 | 1/1995 |
| EP | 0674961 | 10/1995 |
| EP | 1101553 | 5/2001 |
| FR | 1602481 | 1/1971 |

| WO | WO 00/35619 | 6/2000 |
| WO | WO 02/058893 A1 | 8/2002 |
| WO | WO 2005/025792 | 3/2005 |
| WO | WO 2006/034287 A2 | 3/2006 |

* cited by examiner

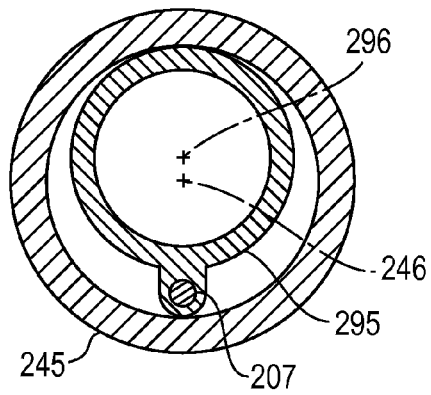
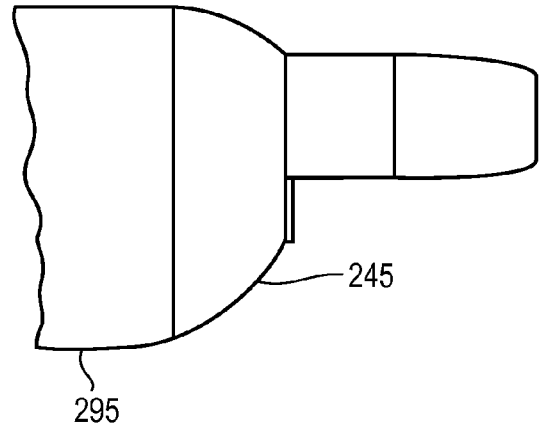
Fig. 8    Fig. 9
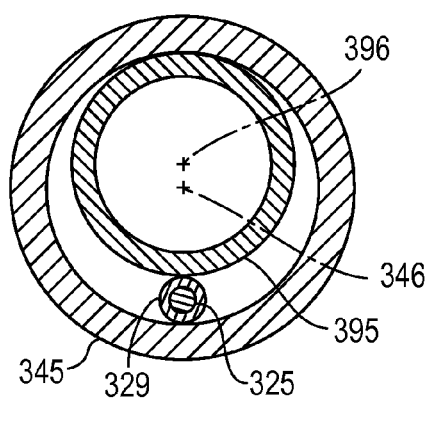
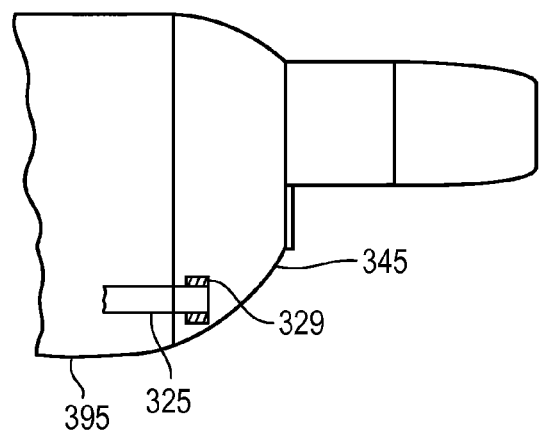
Fig. 10    Fig. 11

PTO SELECTOR MECHANISM WITH BRAKE

CROSS REFERENCE TO RELATED APPLICATIONS

This US non-provisional application claims priority under 35 USC §119 to U.S. Provisional Application No. 60/795,564 filed Apr. 28, 2006, the content of which is incorporated herein in its entirety by reference. This US non-provisional application is a Continuation-In-Part of Ser. No. 11/693,384 filed Mar. 29, 2007, which is a Continuation-In-Part of (1) U.S. application Ser. No. 11/227,200 filed Sep. 16, 2005 and (2) U.S. application Ser. No. 11/400,378 filed Apr. 10, 2006, the content of both of which is incorporated herein in its entirety by reference.

BACKGROUND

1. Field of Endeavor

Example embodiments of the present invention relate in general to tool chucks for attachment of accessories to power drivers, and more particularly to a tool chuck having chuck jaws that may be actuated via power from the driver's transmission.

2. Description of Related Art

A tool chuck may be provided on a power driver for holding an accessory. The tool chuck may be actuated (to open and close the chuck jaws) via a power take off ("PTO") feature. Numerous and varied PTO features are described in commonly-assigned, copending application Ser. Nos. 11/227,200 filed Sep. 16, 2005, 11/400,378 filed Apr. 10, 2006, and 11/693,384 filed Mar. 29, 2007. In those copending applications, the component parts of the PTO mechanism may be positioned to achieve different operational modes inclusive of a MANUAL OVERRIDE MODE, a DRILL/DRIVE MODE and a CHUCK MODE.

SUMMARY

According to an example, non-limiting embodiment, a power driver may include a housing. A tool chuck may have an input shaft mounted for rotation on the housing and supporting chuck jaws, and a chuck actuating shaft may be mounted for rotation on the input shaft. A gear may be mounted on the input shaft. A power take off mechanism may be connected to the tool chuck. The power take off mechanism may be adjustable into a DRILL/DRIVE MODE to rotationally drive the input shaft and the chuck actuating shaft together as a unit, and a CHUCK MODE to use the gear to rotationally drive the chuck actuating shaft relative to the input shaft.

According to another example, non-limiting embodiment, a power driver may include a tool chuck. The tool chuck may have an input shaft supporting chuck jaws, and a chuck actuating shaft may be mounted for rotation on the input shaft. A gear may be mounted on the input shaft. Power take off means may be provided for adjusting into a DRILL/DRIVE MODE to rotationally drive the input shaft and the chuck actuating shaft together as a unit, and a CHUCK MODE to use the gear to rotationally drive the chuck actuating shaft relative to the input shaft.

According to another example, non-limiting embodiment, a power driver may include a tool chuck. The tool chuck may have an input shaft with a rotation axis and a through bore, and a chuck actuating shaft may be mounted for rotation in the through bore. A gear may be provided with a rotation axis that coincides with the rotation axis of the input shaft. The gear may be moveable along the input shaft between a first position in which the gear is rotationally coupled to the chuck actuating shaft via a clutch, and a second position in which the gear is not rotationally coupled to the chuck actuating shaft via the clutch.

According to another example, non-limiting embodiment, a power driver may include a housing. A tool chuck may be mounted on the housing. The tool chuck may have a rotational axis. A mode ring may be mounted for movement on the housing to adjust an operating mode of the tool chuck. A central axis of the mode ring may be offset from the rotational axis of the tool chuck.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the spirit and scope of the invention.

BRIEF DESCRIPTION OF THE DRAWINGS

FIGS. 8-11 are schematic views of example mode rings.

DESCRIPTION OF EXAMPLE, NON-LIMITING EMBODIMENTS

Figure 1:
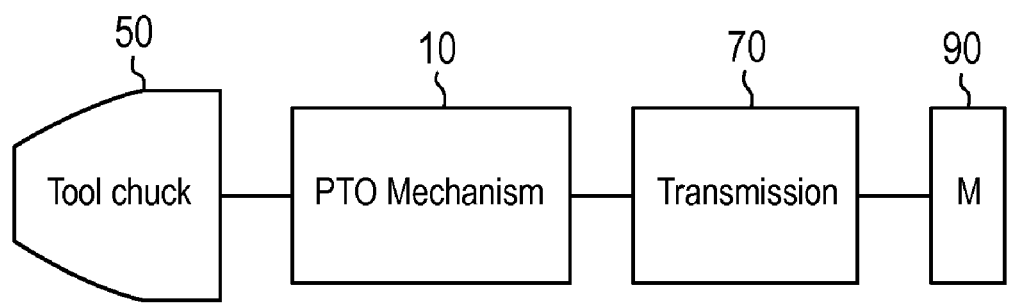
FIG. 1 is a schematic illustration of a tool chuck with a power take off mechanism according to an example, non-limiting embodiment.

I. Example Embodiment Depicted in FIGS. 1-5:

FIG. 1 schematically shows an example, non-limiting embodiment of a tool chuck 50 that may be provided on a power driver (e.g., a drill) for holding an accessory (e.g., a drill bit). It will be appreciated, however, that the tool chuck 50 may be suitably implemented on a variety of power drivers (other than drills) for holding a variety of accessories (other than drill bits).

The tool chuck 50 may be connected to the transmission 70 of the power driver via a power take off ("PTO") mechanism 10. The transmission 70 may be coupled to an electric motor 90. The transmission 70 may use gearing to effect a change in the ratio between an input rpm (from the electric motor 90) and an output rpm (delivered to the tool chuck 50). In this example embodiment, the transmission 70 may be a parallel axis transmission.

Figure 2:
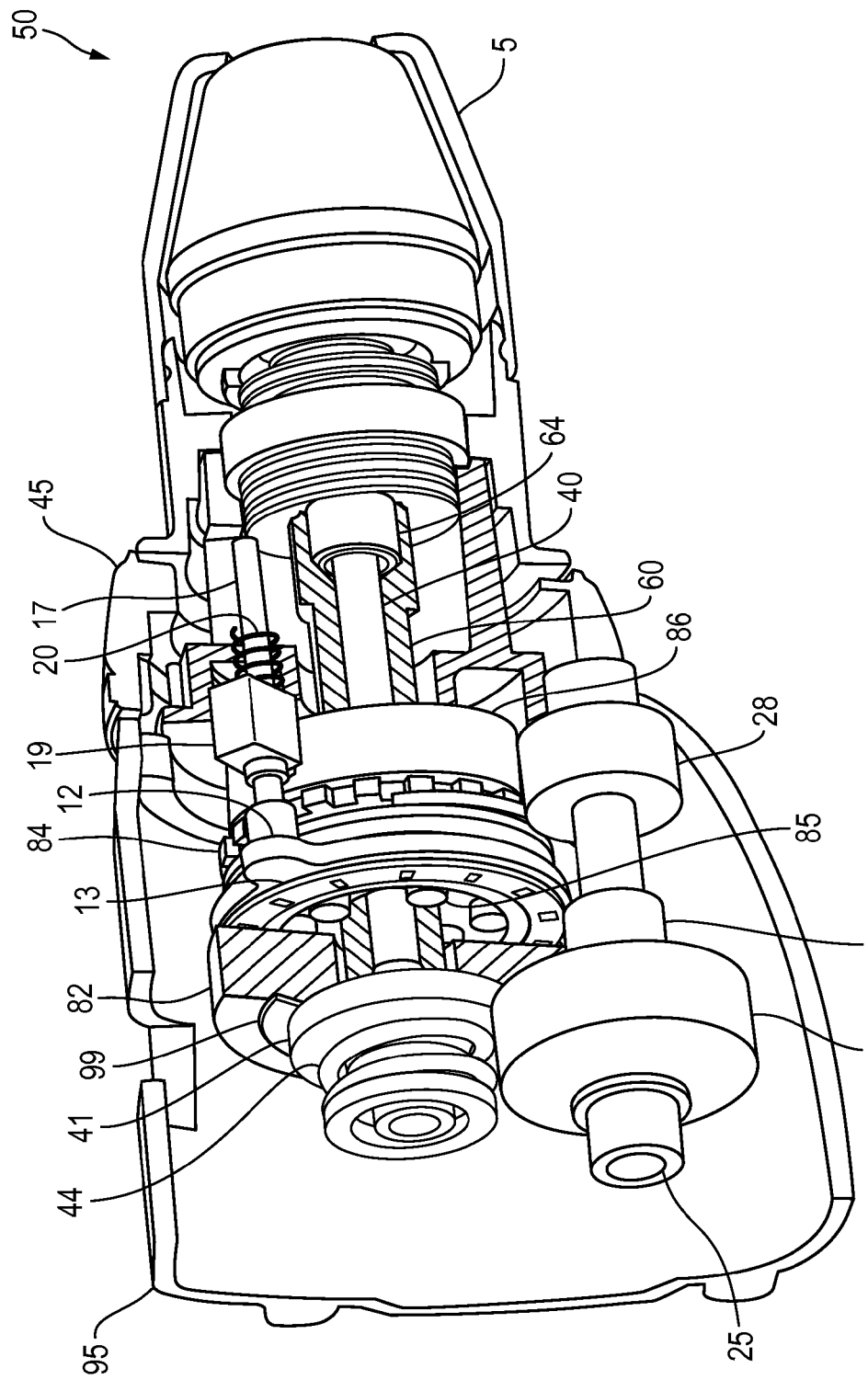
FIGS. 2 and 3 are schematic views of the power take off mechanism in a DRILL/DRIVE MODE.

A. The Structure:

With reference to FIG. 2, the PTO mechanism may include a thrust plate 12 that may be supported by the driver housing 95. To this end, the thrust plate 12 may include legs 17 that may be slidably inserted into respective apertures provided in the driver housing 95. In this way, the thrust plate 12 may be rotationally grounded to the driver housing 95, and at the same time the thrust plate 12 may be moveable in an axial direction and relative to the driver housing 95. The axial forward ends of the legs 17 may interact with a mode ring 45 to influence the thrust plate 12 in an axial direction.

The thrust plate 12 may support a thrust bearing 13 that abuts against a first driven gear 82 mounted for axial movement on an input shaft 60. By virtue of the interaction between the legs 17 and the mode ring 45, the thrust plate 12 may be driven in an axial rearward direction together with the first driven gear 82 (and relative to the input shaft 60) so that an axial rearward facing surface of the first driven gear 82 may become engaged with an axial forward facing surface of a PTO drive disk 41 of a PTO actuator shaft 40. A spring 99 (e.g., a Belleville spring) may be captured between the first driven gear 82 and the PTO drive disk 41 to influence the first driven gear 82 and the PTO drive disk 41 in opposite axial directions.

Figure 3:
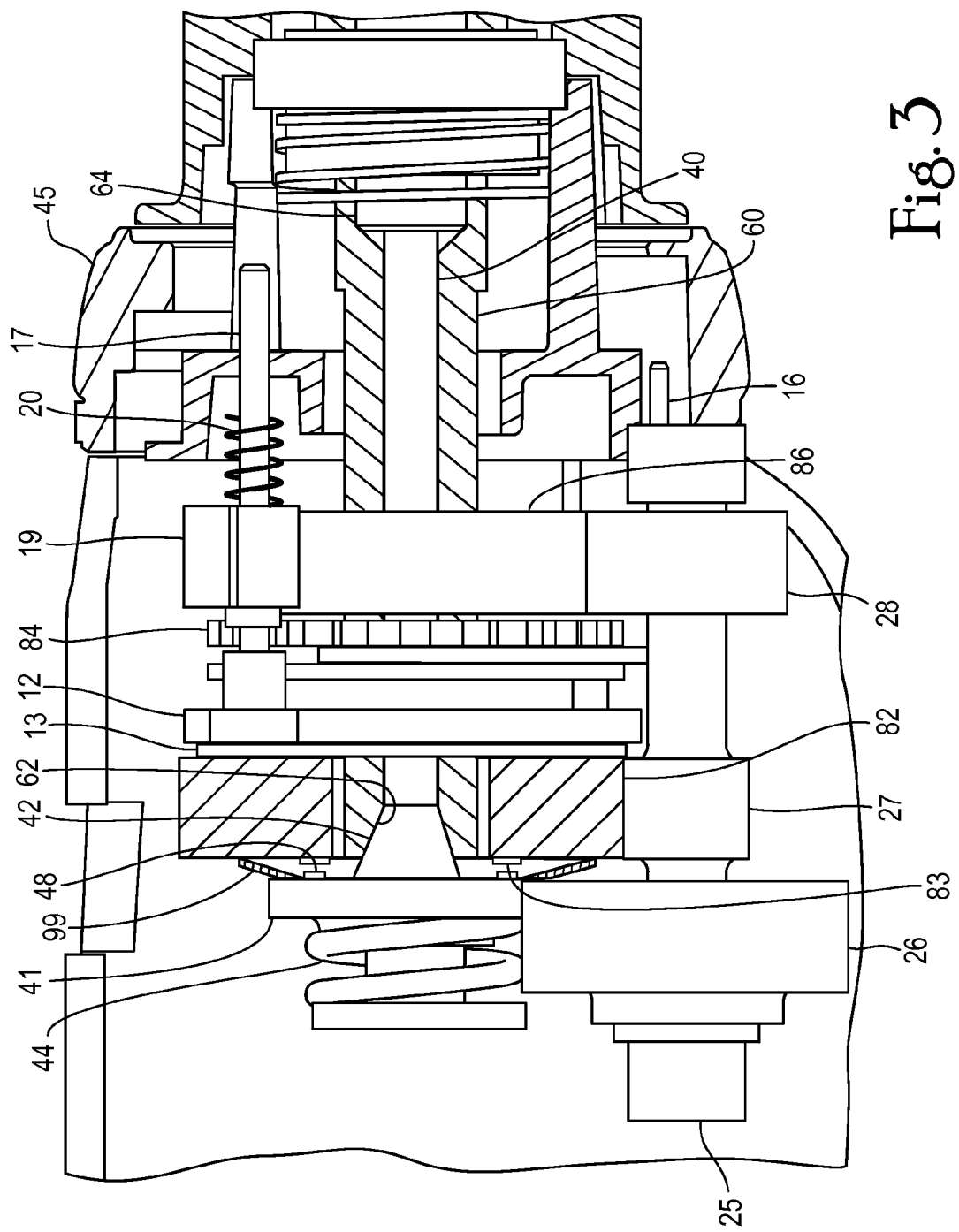

The PTO actuator shaft 40 may have a forward end rotationally fixed to a chuck actuating shaft 64. The PTO actuator shaft 40 may fixedly support the PTO drive disk 41. Turning briefly to FIG. 3, the PTO drive disk 41 may have an axial forward facing surface with clutch features 48 that may selectively cooperate with clutch features 83 on the axial rearward facing surface of the first driven gear 82 (depending on the axial position of the thrust plate 12). The PTO actuator shaft 40 may include a male cone feature 42 that may selectively cooperate with a female cone feature 62 of the input shaft 60 (depending on the axial position of the thrust plate 12). A spring 44 may be captured between a thrust bearing mounted on the driver housing 95 and the PTO drive disk 41 to influence the PTO actuator shaft 40 in an axial forward direction so that the male cone feature 42 fits (and engages) with the female cone feature 62.

The input shaft 60 may support the first driven gear 82, a shift plate 84 and a second driven gear 86. The first driven gear 82 may be mounted for rotation on the input shaft 60 and axially moveable along the input shaft 60. The spring 99 may influence the first driven gear 82 in an axial forward direction (and away from the PTO drive disk 41) to separate the clutch features 83 from the clutch features 48. The forward axial travel of the first driven gear 82 (along the input shaft 60) may be limited by the thrust plate 12. The second driven gear 86 may be axially fixed to (and rotatable relative to) the input shaft 60.

The shift plate 84 may be rotationally fixed to (and axially moveable relative to) the input shaft 60. The shift plate 84 may include drive lugs 85 (as shown in FIG. 2) for selectively engaging with corresponding features (e.g., recesses) respectively provided in the first driven gear 82 and the second driven gear 86 (depending on the axial position of the shift plate 84). As will be described in more detail below, an input shaft lock 19 (which may be mounted for axial movement on the leg 17 of the thrust plate 12) may selectively engage with radial outward facing recesses of the shift plate 84 to rotationally ground the shift plate 84 (and thus the input shaft 60) to the driver housing 95. A spring 20 may be captured between the input shaft lock 19 and the drive housing 95 to influence the input shaft lock 19 in the axial rearward direction.

Figure 4:
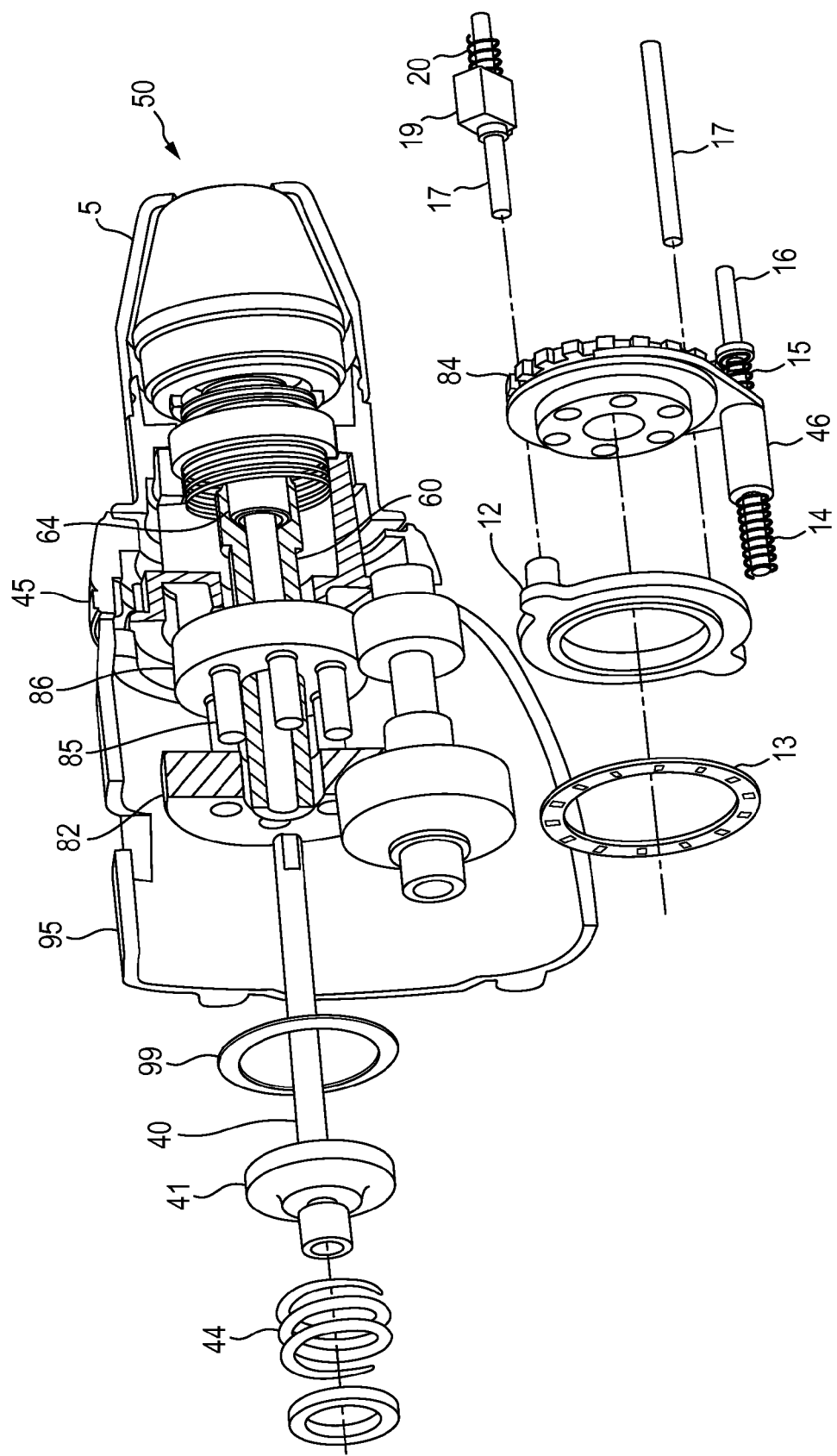
FIG. 4 is an exploded perspective view of the power take off mechanism.
Figure 5:
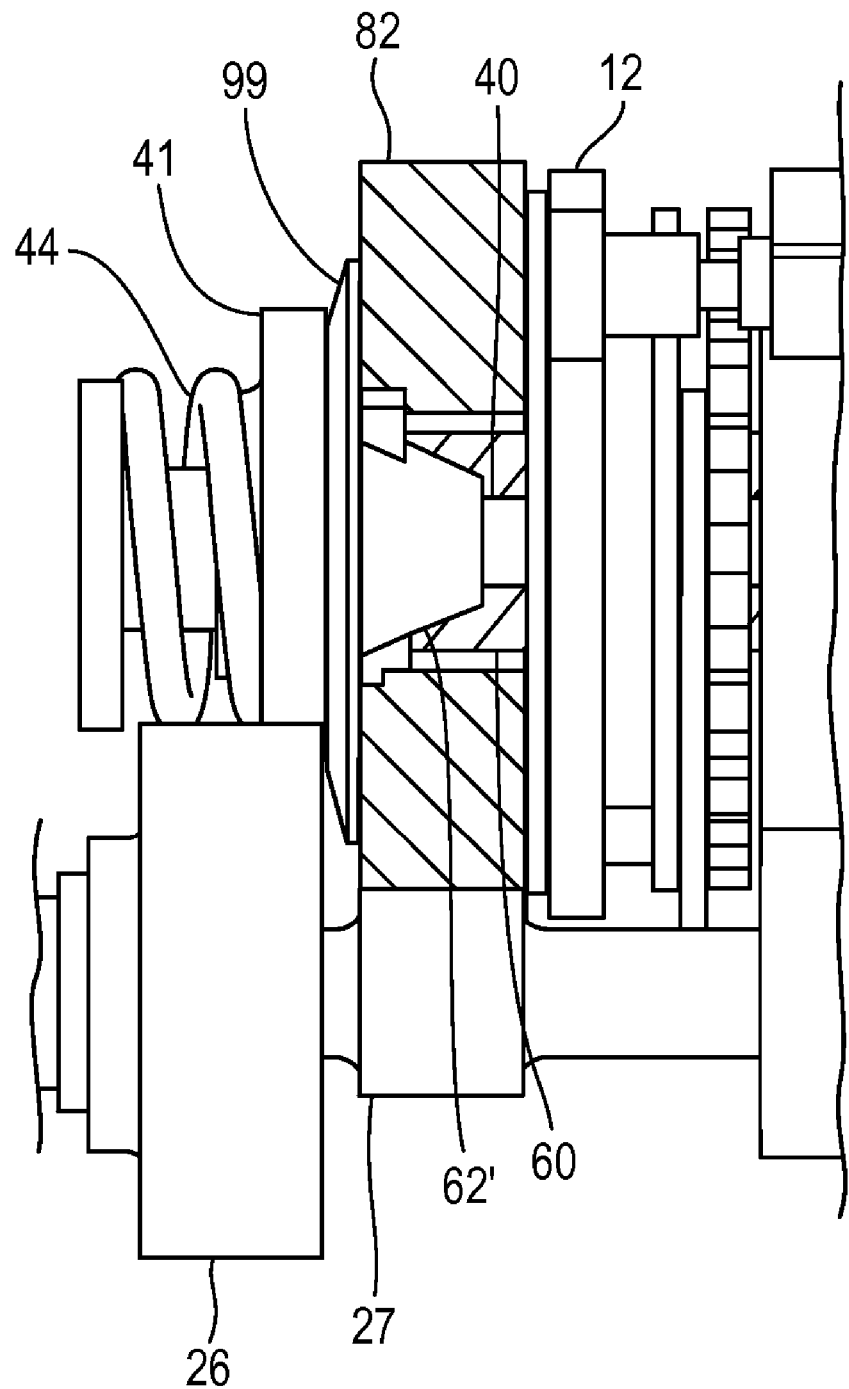
FIG. 5 is a schematic view of an example lock cone that may be implemented in the power take off mechanism.

Turning briefly to FIG. 4, the shift plate 84 may include a circumferential groove that slidably receives a shift fork 46. As will be described in more detail below, a push pin 16 (mounted for axial movement in the driver housing 95) may influence the shift fork 46 (and thus the shift plate 84) to the desired axial position. A spring 15 may be captured between the push pin 16 and the shift fork 46. A spring 14 may be captured between the shift fork 46 and the driver housing 95.

The mode ring 45 may be mounted for rotation on the driver housing 95. The mode ring 45 may include circumferential, axial rearward facing cam surfaces (not shown) respectively corresponding to the push pin 16 and the legs 17. A user may rotate the mode ring 45 (relative to the drive housing 95) so that the cam surfaces may axially displace the legs 17 (to axially position the input shaft lock 19, the thrust plate 12 and the first driven gear 82 along the input shaft 60) and the push pin 16 (to axially position the shift plate 84 along the input shaft 60).

Turning back to FIG. 2, the electric motor may have a rotary shaft that supports an output gear. The output gear may engage with an input gear 26, which may be fixed to an intermediate shaft 25. The intermediate shaft 25 may be mounted for rotation in the driver housing 95. The intermediate shaft 25 may fixedly support a first drive gear 27 and a second drive gear 28. The first drive gear 27 may engage with the first driven gear 82. And the second drive gear 28 may engage with the second driven gear 86. The second drive gear 28 may be larger than the first drive gear 27. Therefore, when the driver is powered up, the second driven gear 86 may be driven at a faster rotational speed than the first driven gear 82.

The tool chuck 50 may include the input shaft 60. As described in commonly-assigned, copending application Ser. Nos. 11/227,200, 11/400,378 and 11/693,384, the axial forward end of the input shaft 60 may be fixed to a jaw holder (not shown). The jaw holder may include passageways through which chuck jaws (not shown) are respectively slidable. The chuck jaws may be moved axially via slots in a chuck actuating screw (not shown).

The input shaft 60 may include a through bore that rotatably supports the chuck actuating shaft 64. The chuck actuating shaft 64 may include a through bore that may receive the PTO actuator shaft 40, such that the chuck actuating shaft 64 and the PTO actuator shaft 40 may be rotationally locked together. The forward end of the chuck actuating shaft 64 may be screw coupled to the chuck actuating screw.

B. The Operation:

A user may rotate the mode ring 45 (relative to the driver housing 95) so that the tool chuck 50 may be operated in a DRILL/DRIVE MODE (and at varied speeds), a MANUAL OVERRIDE MODE or a CHUCK MODE.

FIG. 3 illustrates the DRILL/DRIVE MODE, in which the thrust plate 12 may be located at an axial forward position. Here, the spring 44 may influence the PTO actuator shaft 40 in an axial forward direction so that the male cone feature 42 fits (and engages) with the female cone feature 62 of the input shaft 60. Also, the spring 99 may influence the first driven gear 82 in an axial forward direction (and away from the PTO drive disk 41) to separate the clutch features 83 from the clutch features 48. The forward axial travel of the first driven gear 82 (along the input shaft 60) may be limited by the thrust plate 12.

When the user powers up the driver, the electric motor (via the output gear) may rotationally drive the intermediate shaft 25 (via the input gear 26). The first drive gear 27 and the second drive gear 28 (fixed to the intermediate shaft 25) may rotationally drive the first driven gear 82 and the second driven gear 86, respectively. The shift plate 84 (via the drive lugs 85) may be rotationally locked to the first driven gear 82 or the second driven gear 86 depending on the axial position of the shift plate 84 relative to the input shaft 60.

For example, as shown in FIG. 3, the shift plate 84 may be positioned axially forward and rotationally locked to the second driven gear 86. Here, power from the transmission may be delivered to the input shaft 60 via the second drive gear 28, the second driven gear 86 and the shift plate 84. The first driven gear 82 may rotate relative to the input shaft 60 and the PTO actuator shaft 40.

The input shaft 60 may rotate together as a unit with the jaw holder, the chuck jaws and the chuck actuating screw. At the same time, the input shaft 60 may rotationally drive the PTO actuator shaft 40 (and thus the chuck actuating shaft 64) via the engagement between the male cone feature 42 and the female cone feature 62. To this end, the confronting surfaces of the male cone feature 42 and the female cone feature 62 may be friction surfaces and/or include a complement of radial serrations, for example. This may effectively resist relative motion between the input shaft 60 and the chuck actuating shaft 64 so that the chuck jaws may not open or close during operation.

It will be appreciated that the mode ring 45 may be rotated to achieve gear shifting, while maintaining the tool chuck 50 in the DRILL/DRIVE MODE. For example, as the mode ring 45 is rotated, a circumferential cam surface may drive the push pin 16 (and thus the shift fork 46 and the shift plate 84) in an axial rearward direction (and against the influence of the spring 14), while other circumferential cam surfaces may not axially drive the legs 17. During the axial rearward travel of the shift plate 84, the drive lugs 85 may disengage from the second driven gear 86 and, assuming the shift plate 84 is properly clocked to (or angularly positioned relative to) the first driven gear 82, the drive lugs 85 may engage with the first driven gear 82.

If on the other hand, the shift plate 84 and the first driven gear 82 are not properly clocked, then the shift plate 84 may not be located at the intended axial rearward position. Notwithstanding, the push pin 16 may move to the intended axial rearward position and compress the spring 15. When the driver is powered up, the first driven gear 82 may rotate and become clocked to the shift plate 84. At this time, the spring 15 may drive the shift plate 84 in the axial rearward direction so that the lugs 85 may engage with the first driven gear 82. A similar "compliant" engagement feature may be offered by the spring 14 when the shift plate 84 is moved in the axial forward direction.

The CHUCK MODE may be achieved by rotating the mode ring 45 relative to the driver housing 95. The rotational movements of the mode ring 45 may achieve the following three conditions. First, a circumferential cam surface (of the mode ring 45) may drive the push pin 16 (and thus the shift fork 46 and the shift plate 84) to an axial intermediate position. Here, the shift plate 84 may be disengaged from both the first driven gear 82 and the second driven gear 86.

Second, a circumferential cam surface (of the mode ring 45) may drive the legs 17 in an axial rearward direction. At this time, the spring 20 may influence the input shaft lock 19 (mounted on one of the legs 17) in an axial rearward direction and into the radial outward facing recesses of the shift plate 84 to rotationally ground the shift plate 84 (and thus the input shaft 60) to the driver housing 95. The spring 20 may offer a "compliant" engagement feature when transitioning from the DRILL/DRIVE MODE to the CHUCK MODE.

Third, the legs 17 may drive the thrust plate 12 (and the thrust bearing 13) in an axial rearward direction. During the initial axial rearward travel, the thrust plate 12 may drive the first driven gear 82 in an axial rearward direction (against the influence of the spring 99) so that the clutch features 83 of the first driven gear 82 engage with the clutch features 48 of the PTO drive disk 41. During further axial rearward travel, the thrust plate 12 may drive the first driven gear 82 together with the PTO drive disk 41 in the axial rearward direction (against the influence of the spring 44) so that the male cone feature 42 of the PTO actuator shaft 40 separates from the female cone feature 62 of the input shaft 60.

The user may power up the driver to actuate the tool chuck 50. Power from the transmission may be delivered to the PTO actuator shaft 40 via the first drive gear 27, the first driven gear 82, and the cooperating clutch features 83, 48. The PTO actuator shaft 40 may rotate together with the chuck actuating shaft 64. The chuck actuating shaft 64 may rotate relative to the chuck actuating screw, which may remain rotationally grounded to the driver housing 95 (via the chuck jaws, the jaw holder, the input shaft 60, the shift plate 84 and the input shaft lock 19). This relative rotation may cause the chuck actuating screw to advance or retract in the axial direction (depending on the rotation direction of the chuck actuating shaft 64) to open or close the chuck jaws.

During chuck actuation, the input shaft 60, the jaw holder, the chuck jaws and the chuck actuating screw may remain rotationally grounded to the driver housing 95, while the chuck actuating screw moves axially relative to the jaw holder to open and close the chuck jaws. This may be referred to as a dead spindle feature since the user is not exposed to (or observe) any rotating parts.

Once the tool chuck 50 is tight (i.e., when the chuck jaws clamp the accessory) or fully opened, the cooperating clutch features 48, 83 respectively provided on the PTO drive disk 41 and the first driven gear 82 may give way and slip relative to each other. At this time, the PTO drive disk 41 may move in an axial rearward direction against the influence of the spring 44. When the cooperating clutch features 48, 83 slip, they may produce an audible indication that the chuck actuation process is complete.

The cooperating clutch features 48, 83 may give way or slip at a predetermined torque threshold. The predetermined torque threshold may be suitably adjusted by selecting an appropriate spring 44 and/or by suitably designing the geometries of the cooperating clutch features 48, 83. Further, the predetermined torque threshold for tightening the tool chuck 50 may be less than the predetermined torque threshold for loosening the tool chuck 50. This feature may be obtained by suitably designing the geometries of the cooperating clutch features 48, 83. Numerous and varied clutch surface geometries are well known in this art, and therefore a detailed discussion of the same is omitted.

The MANUAL OVERRIDE MODE may be achieved by rotating the mode ring 45 relative to the driver housing 95 to set the system in CHUCK MODE, and additionally moving the input shaft lock 19 in an axial forward direction. To this end, the input shaft lock 19 may be coupled to a slider button (not shown) mounted for axial movement on the driver housing 95. The user may move the slider button relative to the housing to extract the input shaft lock 19 from the radial outward facing recesses of the shift plate 84. In this condition, the shift plate 84 (and thus the input shaft 60) may be rotatable relative to the driver housing 95, while the first driven gear 82 may be engaged with the PTO drive disk 41 (via the cooperating clutch features 48, 83).

The user may remove a cover 5 and manually rotate the jaw holder (and thus the input shaft 60). At this time, transmission and motor drag may prevent the first driven gear 82 (and thus the PTO actuator shaft 40 and the chuck actuating shaft 64) from rotating relative to the driver housing 95 so that the chuck actuating screw may rotate relative to the chuck actuating shaft 64. This relative rotation may cause the chuck actuating screw to advance or retract in the axial direction (depending on the rotation direction of the input shaft 60) to open or close the chuck jaws.

In the MANUAL OVERRIDE MODE, the clutch features 48, 83 may give way or slip to prevent the system from being over torqued manually and/or in the event that the driver is inadvertently powered up.

In the example embodiment depicted in FIGS. 1-4, the male cone feature 42 of the PTO actuator shaft 40 may engage directly with the female cone feature 62 of the input shaft 60. In an alternative embodiment, and with reference to FIG. 5, the cone feature of the PTO actuator shaft 40 may engage with a lock cone 62' that may be mounted on the axial rear end of the input shaft 60. For example, the lock cone 62' may have radial protruding lugs inserted into slots provided in the input shaft 60. In this way, the lock cone 62' may float radially to accommodate tolerance variations among the component parts.

Figure 6:
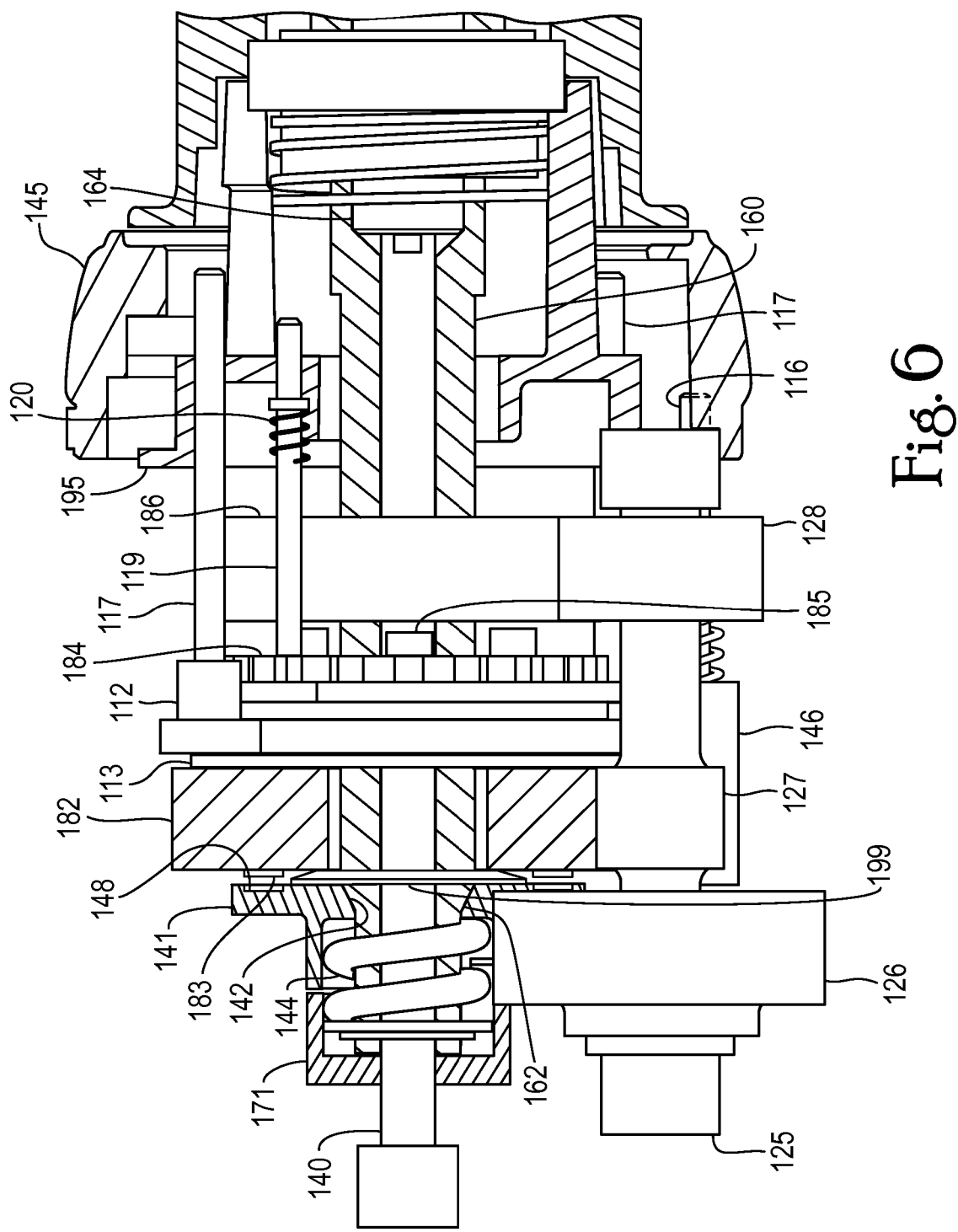
FIGS. 6 and 7 are schematic views of a tool chuck with a power take off mechanism according to another example, non-limiting embodiment.
Figure 7:
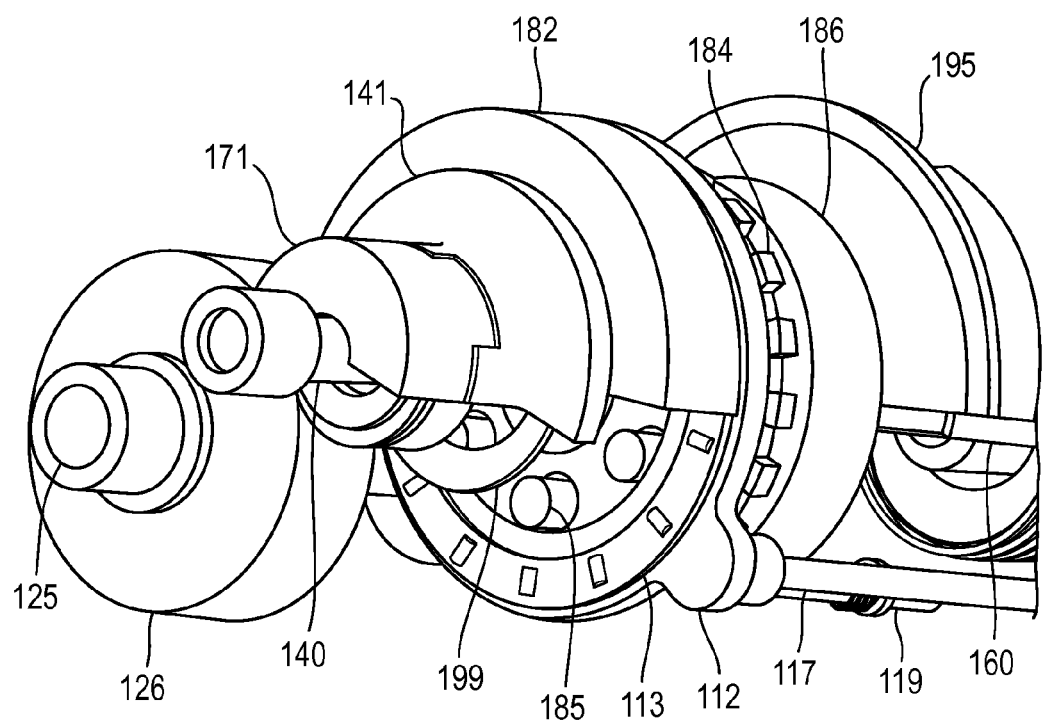

II. Example Embodiment Depicted in FIGS. 6 and 7:

FIGS. 6 and 7 show another example, non-limiting embodiment of a PTO mechanism that may support a tool chuck. This example embodiment is similar to the one noted in section I above to the extent that the tool chuck may be operated in three different modes inclusive of the DRILL/DRIVE MODE, the MANUAL OVERRIDE MODE and the CHUCK MODE. But there are some notable differences.

A. The Structure:

With reference to FIG. 6, the PTO mechanism may include a thrust plate 112 that may be supported by the driver housing 195. To this end, the thrust plate 112 may include legs 117 that may be slidably inserted into respective apertures provided in the driver housing 195. In this way, the thrust plate 112 may be rotationally grounded to the driver housing 195, and at the same time the thrust plate 112 may be moveable in an axial direction and relative to the driver housing 195. The axial forward ends of the legs 117 may interact with a mode ring 145 to influence the thrust plate 112 in an axial direction.

The thrust plate 112 may support a thrust bearing 113 that abuts against a first driven gear 182 mounted for axial movement on an input shaft 160. By virtue of the interaction between the legs 117 and the mode ring 145, the thrust plate 112 may be driven in an axial rearward direction together with the first driven gear 182 (and relative to the input shaft 160) so that an axial rearward facing surface of the first driven gear 182 may become engaged with an axial forward facing surface of a clutch component 141 mounted for rotational and axial movement on the input shaft 160.

The clutch component 141 may have an axial forward facing surface with clutch features 148 that may selectively cooperate with clutch features 183 on the axial rearward facing surface of the first driven gear 182 (depending on the axial position of the thrust plate 112). The clutch component 141 may include a female cone feature 142 that may selectively cooperate with a male cone feature 162 of the input shaft 160 (depending on the axial position of the thrust plate 112). Turning briefly to FIG. 7, the clutch component 141 may include rearward facing lugs that engage with forward facing lugs of a coupler 171 that may be fixedly mounted on a PTO actuator shaft 140.

A spring 199 (e.g., a Belleville spring) may be captured between the first driven gear 182 and the clutch component 141 to influence the first driven gear 182 and the clutch component 141 in opposite axial directions. A spring 144 may be captured between a keeper (e.g., a retaining ring and a washer) mounted on the input shaft 160 and the clutch component 141 to influence the clutch component 141 in an axial forward direction so that the female cone feature 142 fits (and engages) with the male cone feature 162.

The PTO actuator shaft 140 may have a forward end rotationally fixed to a chuck actuating shaft 164. The PTO actuator shaft 140 may fixedly support the coupler 171.

The input shaft 160 may support the first driven gear 182, a shift plate 184 and a second driven gear 186. The first driven gear 182 may be mounted for rotation on the input shaft 160 and axially moveable along the input shaft 160. The spring 199 may influence the first driven gear 182 in an axial forward direction (and away from the clutch component 141) to separate the clutch features 183 from the clutch features 148. The forward axial travel of the first driven gear 182 (along the input shaft 160) may be limited by the thrust plate 112. The second driven gear 186 may be axially fixed to (and rotatable relative to) the input shaft 160.

The shift plate 184 may be rotationally fixed to (and axially moveable relative to) the input shaft 160. The shift plate 184 may include drive lugs 185 for selectively engaging with corresponding features (e.g., recesses) respectively provided in the first driven gear 182 and the second driven gear 186 (depending on the axial position of the shift plate 184). As will be described in more detail below, a push pin 119 (mounted for axial movement in the driver housing 195) may selectively engage with radial outward facing recesses of the shift plate 184 to rotationally ground the shift plate 184 (and thus the input shaft 160) to the driver housing 195. A spring 120 may be captured between the push pin 119 and the drive housing 195 to influence the push pin 119 in the axial forward direction.

As in the previous embodiment, the shift plate 184 may include a circumferential groove that slidably receives a shift fork 146. A push pin 116 (mounted for axial movement in the driver housing 195) may influence the shift fork 146 (and thus the shift plate 184) to the desired axial position.

The mode ring 145 may be mounted for rotation on the driver housing 195. The mode ring 145 may include circumferential, axial rearward facing cam surfaces (not shown) respectively corresponding to the push pins 116, 119 and the legs 117. A user may rotate the mode ring 145 (relative to the drive housing 195) so that the cam surfaces may axially displace the legs 117 (to axially position the thrust plate 112 and the first driven gear 182 along the input shaft 160), the push pin 119 (to selectively ground the shift plate 184 to the driver housing 195) and the push pin 116 (to axially position the shift plate 184 along the input shaft 160).

The electric motor may have a rotary shaft that supports an output gear. The output gear may engage with an input gear 126, which may be fixed to an intermediate shaft 125. The intermediate shaft 125 may be mounted for rotation in the driver housing 195. The intermediate shaft 125 may fixedly support a first drive gear 127 and a second drive gear 128. The first drive gear 127 may engage with the first driven gear 182. And the second drive gear 128 may engage with the second driven gear 186.

As in the previous embodiment, the tool chuck may include the input shaft 160. The axial forward end of the input shaft 160 may be fixed to a jaw holder (not shown). The jaw holder may includes passageways through which chuck jaws (not shown) are respectively slidable. The chuck jaws may be moved axially via slots in a chuck actuating screw (not shown).

The input shaft 160 may include a through bore that rotatably supports the chuck actuating shaft 164. The chuck actuating shaft 164 may include a through bore that may receive the PTO actuator shaft 140, such that the chuck actuating shaft 164 and the PTO actuator shaft 140 may be rotationally locked together. The forward end of the chuck actuating shaft 164 may be screw coupled to the chuck actuating screw.

B. The Operation:

A user may rotate the mode ring 145 (relative to the driver housing 195) so that the tool chuck may be operated in the DRILL/DRIVE MODE (and at varied speeds), the MANUAL OVERRIDE MODE or the CHUCK MODE.

FIG. 6 illustrates the DRILL/DRIVE MODE, in which the thrust plate 112 may be located at an axial forward position. Here, the spring 144 may influence the clutch component 141 in an axial forward direction so that the female cone feature 142 fits (and engages) with the male cone feature 162 of the input shaft 160. Also, the spring 199 may influence the first driven gear 182 in an axial forward direction (and away from the clutch component 141) to separate the clutch features 183 from the clutch features 148. The forward axial travel of the first driven gear 182 (along the input shaft 160) may be limited by the thrust plate 112.

When the user powers up the driver, the electric motor (via the output gear) may rotationally drive the intermediate shaft 125 (via the input gear 126). The first drive gear 127 and the second drive gear 128 (fixed to the intermediate shaft 125) may rotationally drive the first driven gear 182 and the second driven gear 186, respectively. The shift plate 184 (via the drive lugs 185) may be rotationally locked to the first driven gear 182 or the second driven gear 186 depending on the axial position of the shift plate 184 relative to the input shaft 60.

For example, as shown in FIG. 6, the shift plate 184 may be positioned axially rearward and rotationally locked to the first driven gear 182. Here, power from the transmission may be delivered to the input shaft 160 via the first drive gear 127, the first driven gear 182 and the shift plate 184. The second driven gear 186 may rotate relative to the input shaft 160 and the PTO actuator shaft 140.

The input shaft 160 may rotate together as a unit with the jaw holder, the chuck jaws and the chuck actuating screw. At the same time, the input shaft 160 may rotationally drive the PTO actuator shaft 140 (and thus the chuck actuating shaft 164) via the engagement between (1) the male cone feature 162 and the female cone feature 142 of the clutch component 141 and (2) the clutch component 141 and the coupler 171. This may effectively resist relative motion between the input shaft 160 and the chuck actuating shaft 164 so that the chuck jaws may not open or close during operation.

As in the previous embodiment, the mode ring 145 may be rotated to achieve gear shifting, while maintaining the tool chuck in the DRILL/DRIVE MODE.

The CHUCK MODE may be achieved by rotating the mode ring 145 relative to the driver housing 195. The rotational movements of the mode ring 145 may achieve the following three conditions. First, a circumferential cam surface (of the mode ring 145) may drive the push pin 116 (and thus the shift fork 146 and the shift plate 184) to an axial intermediate position. Here, the shift plate 184 may be disengaged from both the first driven gear 182 and the second driven gear 186.

Second, a circumferential cam surface (of the mode ring 145) may drive the push pin 119 in an axial rearward direction and into the radial outward facing recesses of the shift plate 184 to rotationally ground the shift plate 184 (and thus the input shaft 160) to the driver housing 195.

Third, circumferential cam surfaces (of the mode ring 145) may drive the legs 117 (and the thrust plate 112 and the thrust bearing 113) in an axial rearward direction. During the initial axial rearward travel, the thrust plate 112 may drive the first driven gear 182 in an axial rearward direction (against the influence of the spring 199) so that the clutch features 183 of the first driven gear 182 engage with the clutch features 148 of the clutch component 141. During further axial rearward travel, the thrust plate 112 may drive the first driven gear 182 together with the clutch component 141 in the axial rearward direction (against the influence of the spring 144) so that the female cone feature 142 of the clutch component 141 separates from the male cone feature 162 of the input shaft 160.

The user may power up the driver to actuate the tool chuck. Power from the transmission may be delivered to the PTO actuator shaft 140 via the first drive gear 127, the first driven gear 182, the cooperating clutch features 183, 148 and the coupler 171. The PTO actuator shaft 140 may rotate together with the chuck actuating shaft 164. The chuck actuating shaft 164 may rotate relative to the chuck actuating screw, which may remain rotationally grounded to the driver housing 195 (via the chuck jaws, the jaw holder, the input shaft 160, the shift plate 184 and the push pin 119). This relative rotation may cause the chuck actuating screw to advance or retract in the axial direction (depending on the rotation direction of the chuck actuating shaft 164) to open or close the chuck jaws.

Once the tool chuck is tight (i.e., when the chuck jaws clamp the accessory) or fully opened, the cooperating clutch features 148, 183 may give way and slip to limit torque transmitted to the chuck system. At this time, the clutch component 141 may move in an axial rearward direction against the influence of the spring 144.

The MANUAL OVERRIDE MODE may be achieved by rotating the mode ring 145 relative to the driver housing 195. During such rotation, a circumferential cam surface (of the mode ring 145) may allow the push pin 119 (under the influence of the spring 120) to move in an axial forward direction and disengage from the radial outward facing recesses of the shift plate 184. At the same time, the other circumferential cam surfaces (of the mode ring 145) may not axially drive the push pin 116 (and thus the shift plate 184), or the legs 117 (and thus the thrust plate 112). In this condition, the shift plate 184 (and thus the input shaft 160) may be rotatable relative to the driver housing 195, while the first driven gear 182 may be engaged with the PTO actuator shaft 140 (via the cooperating clutch features 148, 183 and the coupler 171).

The user may manually rotate the jaw holder (and thus the input shaft 160). At this time, transmission and motor drag may prevent the first driven gear 182 (and thus the PTO actuator shaft 140 and the chuck actuating shaft 164) from rotating relative to the driver housing 195 so that the chuck actuating screw may rotate relative to the chuck actuating shaft 164. This relative rotation may cause the chuck actuating screw to advance or retract in the axial direction (depending on the rotation direction of the input shaft 160) to open or close the chuck jaws.

In the MANUAL OVERRIDE MODE, the clutch features 148, 183 may give way or slip to prevent the system from being over torqued manually and/or in the event that the driver is inadvertently powered up.

III. Example Embodiments of a Mode Ring—FIGS. 8-11:

Some power drivers may include a clutch mechanism. Clutch mechanisms are well known in this art, and therefore a detailed discussion of the same is omitted. Conventionally, the clutch mechanism may include a clutch pin that extends along the housing. The mode ring and the housing may have concentric centers. Here, however, the mode ring may have a diameter that equals the sum of (1) the housing diameter and (2) two times the clutch pin diameter.

In the example embodiment depicted in FIGS. 8 and 9, the center 246 of the mode ring 245 may be eccentric to the center 296 of the housing 295. Here, the center 296 of the housing 295 may coincide with the rotational axis of the tool chuck. In this arrangement, the clutch pin 207 may extend parallel to the rotational axis of the power driver. In this example embodiment, the mode ring may have a diameter that equals the sum of (1) the housing diameter and (2) the clutch pin diameter. This may allow the power driver to have a smaller girth.

Some power drivers may include a parallel axis gear train including a secondary shaft mounted for rotation in the housing. Conventionally, the secondary shaft may be supported by a front bearing mounted in the power driver. The mode ring and the housing may have concentric centers. The mode ring may be located forward of the front bearing, which may add length to the driver. Alternatively, the front bearing may be nested within the mode ring, which may add girth to the driver.

In the example embodiment depicted in FIGS. 10 and 11, the center 346 of the mode ring 345 may be eccentric to the center 396 of the housing 395. Here, the center 396 of the housing 395 may coincide with the rotational axis of the tool chuck. In this arrangement, the front bearing 329 (supporting the secondary shaft 325) may be nested within the mode ring 345 to allow for a reduced length of the driver. At the same time, this arrangement may allow for a reduced girth of the driver (as compared to a nested arrangement in which the mode ring and the housing may have concentric centers).

Figure 12:
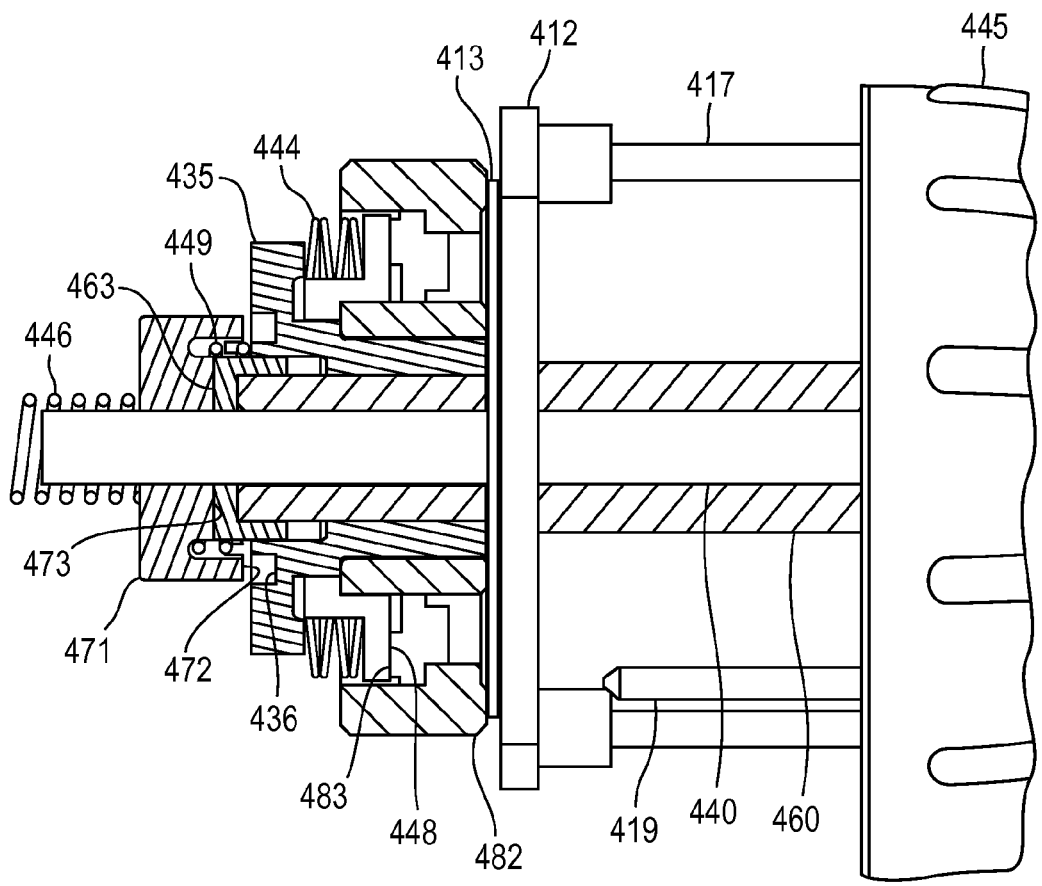
FIGS. 12-14 are schematic views of a tool chuck with a power take off mechanism according to another example, non-limiting embodiment.
Figure 13:
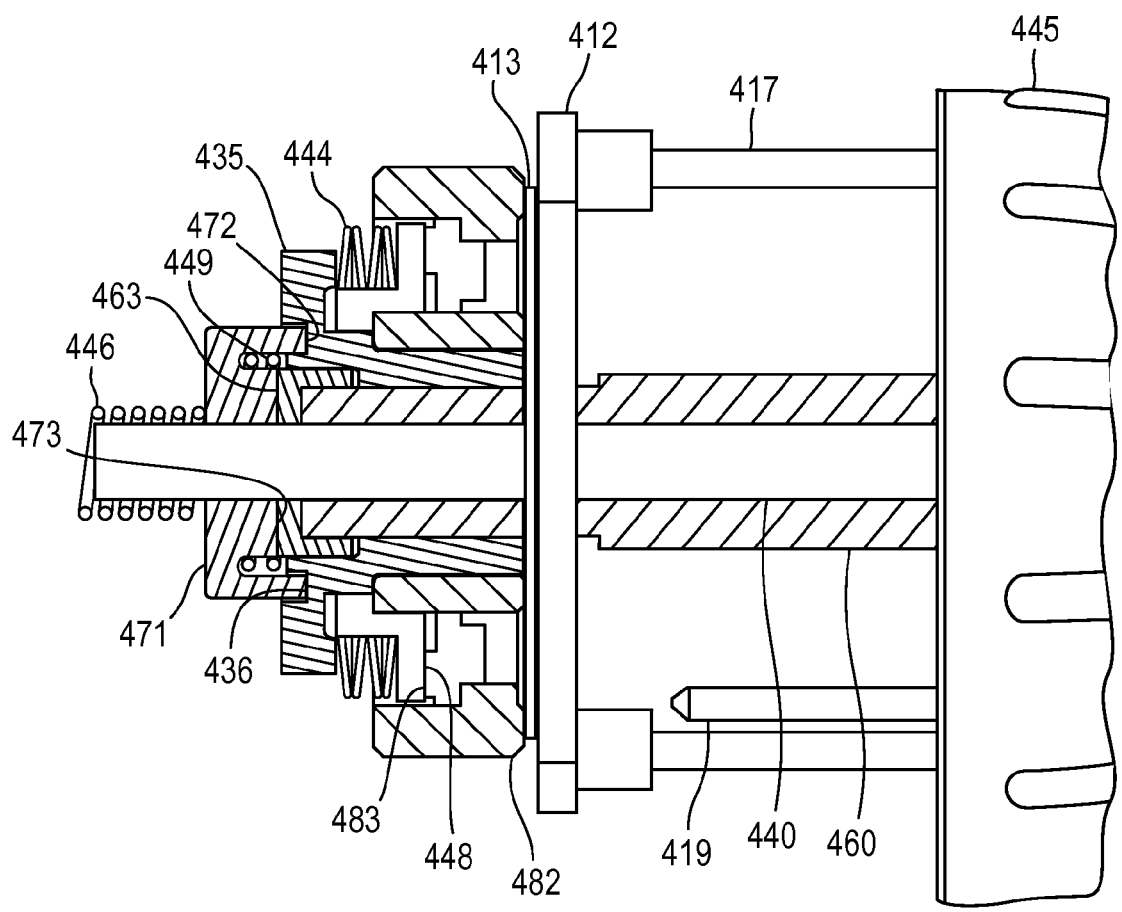
Figure 14:
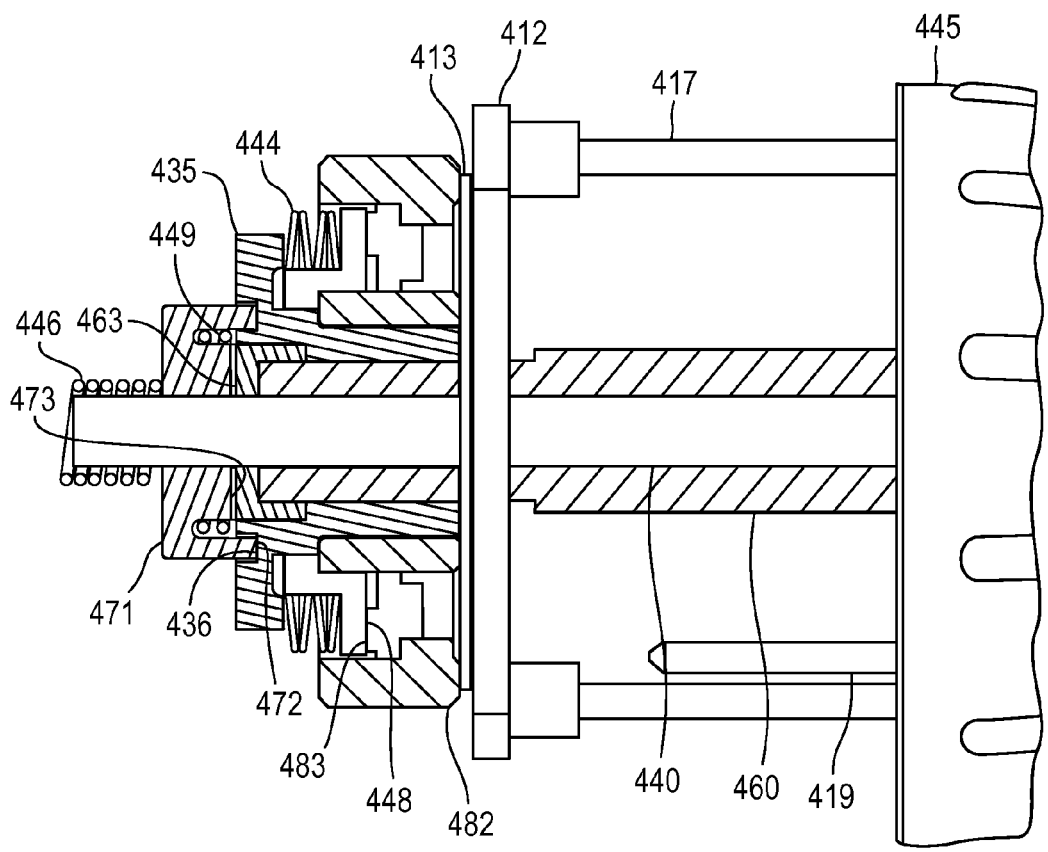

IV. Example Embodiment Depicted in FIGS. 12-14:

FIGS. 12-14 show another example, non-limiting embodiment of a PTO mechanism that may support a tool chuck. This example embodiment is similar to the ones noted in sections I and II above to the extent that the tool chuck may be operated in three different modes inclusive of the DRILL/DRIVE MODE, the MANUAL OVERRIDE MODE and the CHUCK MODE. But there are some notable differences.

For clarity and ease of description, FIGS. 12-14 do not depict the secondary shaft, numerous gearing components, the shift plate or the tool chuck, all of which may be similar to those discussed with respect to the previous embodiments.

A. The Structure:

With reference to FIG. 12, the PTO mechanism may include a thrust plate 412 that may be supported by the driver housing. The thrust plate 412 may include legs 417 that may be slidably inserted into respective apertures provided in the driver housing. The axial forward ends of the legs 417 may interact with a mode ring 445 to influence the thrust plate 412 in an axial direction.

The thrust plate 412 may support a thrust bearing 413 that abuts against a first driven gear 482. The first driven gear 482 may be mounted for rotation on a hub 435 and axially fixed to the hub 435. The hub 435 may be mounted for axial and rotational movement on an input shaft 460.

The first driven gear 482 may fixedly support a drive clutch 483. The drive clutch 483 may interact with a driven clutch 448 that may be rotationally fixed to the hub 435 and axially moveable along the hub 435. A spring 444 may be captured between the hub 435 and the driven clutch 448 to influence the driven clutch 448 toward the drive clutch 483.

The hub 435 may include axial rearward facing recesses 436. The recesses 436 may selectively receive axial forward facing lugs 472 of a coupler 471. A spring 449 may be captured between the coupler 471 and the hub 435 to influence the hub 435 in an axial forward direction and away from the lugs 472.

The coupler 471 may be rotationally fixed to a PTO actuator shaft 440 and axially moveable along the PTO actuator shaft 440. The coupler 471 may include an axial forward facing surface 473 that may selectively cooperate with an axial rearward facing surface 463 of a cap fixedly mounted on the input shaft 460 (depending on the axial position of the coupler 471). A spring 446 may be captured between the driver housing and the coupler 471 to influence the coupler 471 in an axial forward direction so that the axial forward facing surface 473 engages with the axial rearward facing surface 463 of the cap.

The PTO actuator shaft 440 may have a forward end rotationally fixed to a chuck actuating shaft (not shown). The input shaft 460 may support the first driven gear 482, a shift plate (not shown) and a second driven gear (not shown). A push pin 419 (mounted for axial movement in the driver housing) may selectively engage with radial outward facing recesses of the shift plate to rotationally ground the shift plate (and thus the input shaft 460) to the driver housing.

The mode ring 445 may be mounted for rotation on the driver housing. A user may rotate the mode ring 445 (relative to the drive housing) so that the cam surfaces may axially displace the legs 417 (to axially position the thrust plate 412 and the first driven gear 182 along the input shaft 160), the push pin 419 (to selectively ground the shift plate to the driver housing) and a push pin (to axially position the shift plate along the input shaft 460).

The secondary shaft (not shown) and the associated gearing (not shown) may be similar to those discussed with respect to the previous embodiments. The tool chuck (not shown) may be similar to those discussed with respect to the previous embodiments.

B. The Operation:

A user may rotate the mode ring 445 (relative to the driver housing) so that the tool chuck may be operated in the DRILL/DRIVE MODE (and at varied speeds), the MANUAL OVERRIDE MODE or the CHUCK MODE.

FIG. 12 illustrates the DRILL/DRIVE MODE, in which the thrust plate 412 may be located at an axial forward position. Here, the spring 446 may influence the coupler 471 in an axial forward direction so that the axial forward facing surface 473 engages with the axial rearward facing surface 463 of the cap. Also, the spring 449 may influence the hub 435 in an axial forward direction to separate the lugs 472 from the recesses 436. The forward axial travel of the hub 435 (and thus the first driven gear 482 may be limited by the thrust plate 412.

When the user powers up the driver, gearing components (not shown) may rotationally drive the input shaft 460. The input shaft 460 may rotate together as a unit with the jaw holder, the chuck jaws and the chuck actuating screw. At the same time, the input shaft 460 may rotationally drive the PTO actuator shaft 440 via the engagement between the confronting surfaces 463, 473. To this end, the confronting surfaces 463, 473 may be friction surfaces and/or include a complement of radial serrations, for example. This may effectively resist relative motion between the input shaft 460 and the chuck actuating shaft (not shown) so that the chuck jaws may not open or close during operation.

The CHUCK MODE may be achieved by rotating the mode ring 445 relative to the driver housing. The rotational movements of the mode ring 445 may achieve the following three conditions. First, a circumferential cam surface (of the mode ring 445) may drive a push pin (and thus the shift plate) to an axial intermediate position.

Second, a circumferential cam surface (of the mode ring 445) may drive the push pin 419 in an axial rearward direction to rotationally ground the shift plate (and thus the input shaft 460) to the driver housing.

Third, circumferential cam surfaces (of the mode ring 445) may drive the legs 417 (and the thrust plate 412 and the thrust bearing 413) in an axial rearward direction. During the initial axial rearward travel, and with reference to FIG. 13, the thrust plate 412 may drive the first driven gear 482 (and the hub 435)

in an axial rearward direction (against the influence of the spring 449) so that the lugs 472 of the coupler 471 may enter into (and engage with) the recesses 436 of the hub 435.

During further axial rearward travel, and with reference to FIG. 14, the thrust plate 412 may drive the first driven gear 482 (and the hub 435) together with the coupler 471 in the axial rearward direction (against the influence of the spring 446) so that the axial forward facing surface 473 of the coupler 471 separates from the axial rearward facing surface 463 of the cap.

The user may power up the driver to actuate the tool chuck. Power from the transmission may be delivered to the PTO actuator shaft 440 via a first drive gear (not shown), the first driven gear 282, the drive clutch 483 and the driven clutch 448, the hub 435 and the coupler 471. The PTO actuator shaft 440 (and thus the chuck actuating shaft) may rotate relative to the chuck actuating screw, which may remain rotationally grounded to the driver housing (via the chuck jaws, the jaw holder, the input shaft 460, the shift plate and the push pin 419). This relative rotation may cause the chuck actuating screw to advance or retract in the axial direction (depending on the rotation direction of the chuck actuating shaft 164) to open or close the chuck jaws.

Once the tool chuck is tight (i.e., when the chuck jaws clamp the accessory) or fully opened, the drive clutch 483 and the driven clutch 448 may give way and slip to limit torque transmitted to the chuck system. At this time, the driven clutch 448 may move in an axial rearward direction against the influence of the spring 444.

The MANUAL OVERRIDE MODE may be achieved by rotating the mode ring 445 relative to the driver housing. During such rotation, a circumferential cam surface (of the mode ring 445) may allow the push pin 419 (under the influence of a spring) to move in an axial forward direction and disengage from the radial outward facing recesses of the shift plate (not shown). In this condition, the input shaft 460 may be rotatable relative to the driver housing, while the first driven gear 482 may be engaged with the PTO actuator shaft 440 (via the cooperating clutch features 483, 448, the hub 435 and the coupler 471).

The user may manually rotate the jaw holder (and thus the input shaft 460). At this time, transmission and motor drag may prevent the first driven gear 482 (and thus the PTO actuator shaft 440 and the chuck actuating shaft) from rotating relative to the driver housing so that the chuck actuating screw may rotate relative to the chuck actuating shaft. This relative rotation may cause the chuck actuating screw to advance or retract in the axial direction (depending on the rotation direction of the input shaft 460) to open or close the chuck jaws.

In the MANUAL OVERRIDE MODE, the clutch features 448, 483 may give way or slip to prevent the system from being over torqued manually and/or in the event that the driver is inadvertently powered up.

What is claimed is:

1. A power driver comprising:
   a housing;
   a tool chuck having
      an input shaft mounted for rotation on the housing and supporting chuck jaws, and
      a chuck actuating shaft mounted for rotation on the input shaft;
   a gear mounted on the input shaft, such that the input shaft is internal of the gear; and
   a power take off mechanism connected to the tool chuck, the power take off mechanism being adjustable into
      a DRILL/DRIVE MODE so that the input shaft and the chuck actuating shaft are rotatable together as a unit, and
      a CHUCK MODE to use the gear to rotationally drive the chuck actuating shaft relative to the input shaft.

2. The power driver as set forth in claim 1, wherein the gear is mounted on the input shaft for rotational and axial movement relative to the input shaft.

3. The power driver as set forth in claim 1, further comprising a brake interposed between the input shaft and the chuck actuating shaft.

4. The power driver as set forth in claim 3, wherein the brake is activated when the power take off mechanism is in the DRILL/DRIVE MODE.

5. The power driver as set forth in claim 3, wherein the brake is deactivated when the power take off mechanism is in the CHUCK MODE.

6. The power driver as set forth in claim 3, wherein the brake comprise a surface of the input shaft that selectively abuts against a corresponding surface of a component rotationally fixed to the chuck actuating shaft.

7. The power driver as set forth in claim 6, wherein the component is a PTO actuator shaft mounted for rotation in the input shaft.

8. The power driver as set forth in claim 6, wherein the surface of the input shaft is inclined relative to a rotational axis of the input shaft.

9. The power driver as set forth in claim 1, wherein the power take off mechanism includes a thrust plate rotationally locked to the housing and moveable along a rotational axis of the input shaft to position the gear.

10. The power driver as set forth in claim 9, further comprising a mode ring mounted on the housing for rotation to drive the thrust plate along the rotational axis of the input shaft.

11. The power driver as set forth in claim 10, wherein a center of the mode ring is eccentric to a center of the housing.

12. A power driver comprising:
   a housing;
   a tool chuck having
      an input shaft mounted for rotation on the housing and supporting chuck jaws, and
      a chuck actuating shaft mounted for rotation on the input shaft;
   a gear mounted on the input shaft; and
   a power take off mechanism connected to the tool chuck, the power take off mechanism being adjustable into
      a DRILL/DRIVE MODE so that the input shaft and the chuck actuating shaft are rotatable together as a unit, and
      a CHUCK MODE to use the gear to rotationally drive the chuck actuating shaft relative to the input shaft:
   wherein the gear is rotationally coupled to the chuck actuating shaft via a clutch when the power take off mechanism is in the CHUCK MODE.

13. A power driver comprising:
   a tool chuck having
      an input shaft supporting chuck jaws, and
      a chuck actuating shaft mounted for rotation on the input shaft;
   a gear mounted on the input shaft, such that the input shaft is internal of the gear; and power take off means for adjusting into
      a DRILL/DRIVE MODE so that the input shaft and the chuck actuating shaft are rotatable together as a unit, and a CHUCK MODE to use the gear to rotationally drive the chuck actuating shaft relative to the input shaft.

14. The power driver as set forth in claim 13, further comprising a brake interposed between the input shaft and the chuck actuating shaft.

15. The power driver as set forth in claim 14, wherein the brake comprise a surface of the input shaft that selectively abuts against a corresponding surface of a component rotationally fixed to the chuck actuating shaft.

16. The power driver as set forth in claim 15, wherein the component is a PTO actuator shaft mounted for rotation in the input shaft.

17. The power driver as set forth in claim 16, wherein the surface of the input shaft is inclined relative to a rotational axis of the input shaft.

18. The power driver as set forth in claim 13, wherein the power take off means includes a thrust plate moveable along a rotational axis of the input shaft to position the gear.

19. A power driver comprising:
a tool chuck having
   an input shaft supporting chuck jaws, and
   a chuck actuating shaft mounted for rotation on the input shaft:
a gear mounted on the input shaft: and
power take off means for adjusting into
   a DRILL/DRIVE MODE so that the input shaft and the chuck actuating shaft are rotatable together as a unit, and
   a CHUCK MODE to use the gear to rotationally drive the chuck actuating shaft relative to the input shaft:
wherein the gear is rotationally coupled to the chuck actuating shaft via a clutch when the power take off means is in the CHUCK MODE.

* * * * *